3,169,952
FIBER REACTIVE COPPER COMPLEX
MONOAZO-DYESTUFFS
Henri Riat, Arlesheim, and René de Montmollin, Riehen, Switzerland, assignors to Ciba Corporation, a corporation of Delaware
No Drawing. Filed Jan. 24, 1961, Ser. No. 84,492
Claims priority, application Switzerland, Jan. 28, 1960, 919/60; Apr. 21, 1960, 4,459/60; Dec. 6, 1960, 13,640/60
11 Claims. (Cl. 260—146)

This invention provides complex metal compounds of monoazo-dyestuffs which in the form of the free acids correspond to the general formula (1)

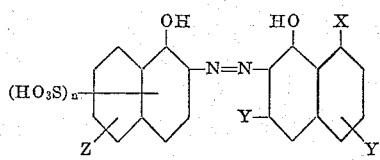

in which $n$ is the whole number 1, 2 or 3, X represents an acylamino group, Y represents a hydrogen atom or a sulfonic acid group, Z represents a hydrogen or halogen atom or a nitro or acylamino group, and at least one of the symbols X and Z represents a reactive aliphatic acylamino or triazinylamino radical and at least one of the symbols Y represents a sulfonic acid group.

By a reactive aliphatic acylamino radical is meant a grouping capable of combining chemically with the hydroxyl groups of cellulose with the splitting up of a multiple bond or the splitting off of a loosely bound substituent, especially a halogen atom, and more especially the radical, bound through a nitrogen bridge, of an aliphatic $\beta$-halogenated and/or $\alpha:\beta$-unsaturated carboxylic acid containing at most three or, when a halogen atom is present, at most four carbon atoms.

By a reactive triazinylamino radical is meant a 1:3:5-triazine nucleus which is bound through a nitrogen bridge and contains at least one directly bound substituent capable of being split off, especially a halogen atom.

The invention provides more especially 1:2-chromium or cobalt compounds and 1:1-copper compounds of the aforesaid monoazo-dyestuffs, and especially copper compounds of monoazo-dyestuffs of the formula (2)

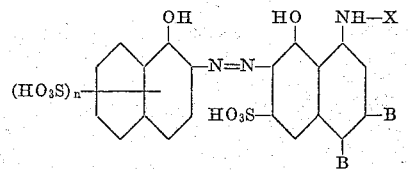

in which one of the symbols B represents a hydrogen atom and the other represents a sulfonic acid group, X represents an at least monohalogenated 1:3:5-triazine radical, and $n$ represents the whole number 1, 2 or 3.

The invention also provides a process for the manufacture of the aforesaid metalliferous monoazo-dyestuffs, wherein the corresponding metal-free ortho:ortho'-dihydroxy-azo-dyestuff is metallized, or wherein there is oxidatively coppered a monohydroxy-azo-dyestuff of the formula (3)

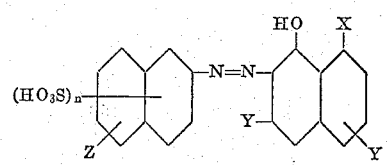

in which X, Y, Z and $n$ have the meanings given above in connection with Formula 1, or wherein a complex metal compound of a dyestuff of the Formula 1, in which at least one of the symbols X and Z represents an acylatable amino group, more especially a primary amino group, is acylated at the acylatable amino group by a method in itself known with an anhydride or halide of an aliphatic acid, of which the acyl radical is capable of reacting in the manner referred to above with fibrous materials with the formation of a chemical bond, or with a halogen-triazine in such manner that a reactive acyl radical is formed.

As such anhydrides or halides of aliphatic acids, of which the acyl radical is reactive, there may be mentioned, for examples, anhydrides and halides of aliphatic $\alpha:\beta$-unsaturated carboxylic acids, for example, chloromaleic anhydride, propiolic acid chloride, acrylic acid chloride, chloroacrylic acid chloride, and especially halides of aliphatic carboxylic acids containing a mobile halogen atom, such as chloroacetyl chloride, sulfo-chloracetic acid chloride, $\beta$-bromo- or $\beta$-chloro-propionic acid chloride or $\alpha:\beta$-dichloro-propionic acid chloride. As halogen-triazines there may be mentioned, cyanuric chloride, cyanuric bromide, and primary condensation products of cyanuric chloride, which contain two chlorine atoms, and, in place of the third chlorine atom, a primary amino group or an organic radical. Such primary condensation products are, for example, 2-phenyl-4:6-dichloro-1:3:5-triazine or 2-methyl-4:6-dichloro-1:3:5-triazine, and condensation products of one molecular proportion of cyanuric chloride or cyanuric bromide with molecular proportion of ammonia or a reactive organic mercapto- or hydroxyl-compound, for example, one molecular proportion of a thiophenol, a mercapto-benzthiazole, or a thio-alcohol, such as mercapto-acetic acid or a thio-acid, such as diethyldithiocarbamic acid, or one molecular proportion of a phenol, a phenol sulfonic acid or an alcohol, such as methyl, ethyl or propyl alcohol; or such condensation products with one molecular proportion of an at most secondary amine, for example, methylamine, ethylamine, $\beta$-hydroxyethylamine, isopropylamine, $\gamma$-hydroxypropylamine, methoxy-ethylamine, methoxy-propylamine, cyclohexylamine, morpholine, dimethylamine, diethylamine, N-methyl-phenylamine, para-toluidine, chlorethylamine, an ethanolamine, a carbamic acid ester, aminoacetic acid ethyl ester, aniline, amino-ethane sulfonic acid, N-methyl-amino-ethane sulfonic acid, ortho-, meta- or para-aminobenzoic acid, aminobenzene sulfonic acids, such as ortho-, meta-, or para-amino-benzene-sulfonic acid or 1-aminobenzene-2:5-disulfonic acid, or an aminonaphthalene mono-, di- or tri-sulfonic acid, for example, 1-aminonaphthalene-6-sulfonic acid, or 4- or 5-aminosalicylic acid. Triazine radicals, which contain no free halogen atoms, are also reactive provided that, instead of such atoms, other loosely bound substituents, for example, phenoxy groups or groups of the formula

bound through the sulfur atom, are present.

The metalliferous starting dyestuffs to be acylated can be made by methods in themselves known by hydrolysing the corresponding metal complexes containing acylamino groups and obtained by oxidative coppering, and of which the acyl group is that a carboxylic acid of low molecular weight, and, if desired, by de-coppering and re-metallizing to form a different heavy metal compound.

Thus, a monohydroxy-monoazo-dyestuffs of the formula (4)
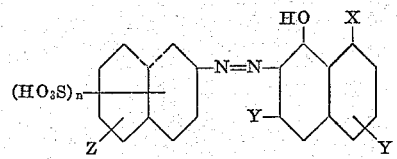

in which X, Y, Z and $n$ have the meanings given above in connection with Formula 1, may be treated with an agent yielding copper, for example, copper acetate or copper sulfate, in the presence of an oxidizing agent, for example, hydrogen peroxide, and an amino group in the complex so obtained is liberated by hydrolysis and/or reduction.

Such metallizable monoazo-dyestuffs can be made, for example, by coupling 1-amino-8-hydroxynaphthalene-4- or -6-sulfonic acid, 1-amino-8-hydroxynaphthalene-3:6- or -4:6-disulfonic acid, or 1-acylamino-8-hydroxynaphthalene-3:6- or -4:6-disulfonic acid, for example, 1-benzoyl-amino-, 1-(2'- or 4'-chlorobenzoylamino)-, 1-acrylamino-, 1-acetylamino-, 1-propionylamino-, 1-$\beta$-chloropropionyl-amino- or 1-n-butyrylamino-8-hydroxynaphthalene-3:6- or -4:6-disulfonic acid with a diazotized 2-aminonaphthalene sulfonic acid which contains no substituent in the 1-position.

As 2-aminonaphthalene sulfonic acids containing no substituent in the 1-position there may be mentioned, for example, 2-aminonaphthalene-4:8-, -4:6, or -5:7-disulfonic acid,
2-aminonaphthalene-6:8-disulfonic acid,
2-aminonaphthalene-4:6:8-trisulfonic acid,
2-aminonaphthalene-5- or -6-monosulfonic acid,
6-nitro-2-aminonaphthalene-4:8-disulfonic acid,
6-chloro-2-aminonaphthalene-4:8-disulfonic acid,
6-nitro-2-aminonaphthalene-8-sulfonic acid, and
6-acetylamino-2-aminonaphthalene-4:8-disulfonic acid.

When there is used for making a complex metal compound serving as starting material a dyestuff of the Formula 4 which contains an acylatable amino group, it is necessary, prior to the acylation in the process of the invention or during the metallization, to liberate an amino group, for example by hydrolysing the substituent X or Z, or by reduction, when Z is a nitro group.

Alternatively, the dyestuffs of the invention can be made by oxidative metallization, if a starting dyestuff of the Formula 4 is used in which at least one of the symbols X and Z represents a reactive acylamino group of the kind referred to above. Such dyestuffs can be obtained from the aforesaid 2-aminonaphthalene sulfonic acids containing no substituent in the 1-position by diazotizing and coupling them with 1-hydroxy-naphthalene-sulfonic acids which contain in the 8-position the reactive acylamino group of which the acyl radical is, for example, a halogen-1:3:5-triazine radical, halogen or propionyl radical or an acryloyl radical.

The metal compounds to be acylated in accordance with the invention can also be made by metallizing, for example, coppering, chroming or cobaltizing, an ortho: ortho'-dihydroxymonoazo-dyestuff, obtainable from one of the aforesaid 1-amino-8-hydroxynaphthalene sulfonic acids by coupling it with a diazotized 1-hydroxy-2-amino-naphthalene sulfonic acid, and especially with diazotized 1-hydroxy-2-amino-naphthalene-4:8-disulfonic acid or 1-hydroxy-2-aminonaphthalene-4- or 5-sulfonic acid or 1-hydroxy-2-aminonaphthalene-4:6:8-trisulfonic acid.

The acylation of the complex metal compounds of monoazo-dyestuffs of the Formula 1, in which at least one of the symbols X and Z represents an acylatable amino group, with one of the aforesaid acid halides or anhydrides, especially with a dihalogen-triazine compound, is advantageously carried out in the presence of an acid-binding agent, such as sodium acetate, sodium hydroxide or sodium carbonate, and under conditions such that the finished product contains at least one exchangeable halogen atom or an $\alpha:\beta$-unsaturated bond, that is to say, for example, by working in the presence of an organic solvent or at a relatively low temperature in an aqueous medium.

The resulting condensation products of metalliferous monoazo-dyestuffs which contain a monohalogen-triazine radical can also be made by reacting with ammonia or an organic hydroxyl compound or an organic amine a further halogen atom present in a primary condensation product which has been obtained by condensing a metalliferous dyestuff of the kind described above with a cyanuric halide and which contains two exchangeable halogen atoms.

Alternatively, the acylation in the process of the invention can be carried out, as stated above, before the dyestuffs are metallized, if dyestuffs are used which can be so easily metallized that the halogen atom of the metal-free dyestuff condensation product is not attacked during the metallization.

The new dyestuffs of this invention are valuable for dyeing or printing a very wide variety of fibrous materials, such as cellulose, regenerated cellulose such as viscose, linen or especially cotton. They are suitable for dyeing by the so-called direct dyeing methods and especially by printing methods or the pad dyeing method, in which the dyestuff is applied to the material to be dyed and is fixed on the fiber in the presence of an alkali, if desired, with the action of heat, for example, by steaming.

The dyeings produced with the new dyestuffs on cellulose fibers are generally distinguished by their good fastness to light and above all by their excellent fastness to washing.

The following examples illustrate the invention, the parts and percentages being by weight, and the relationship of parts by weight to parts by volume being the same as that of the kilogram to the liter:

EXAMPLE 1

A diazo compound prepared in the usual manner from 30.3 parts of 2-aminonaphthalene-4:8-disulfonic acid is coupled with 36.1 parts of 1-acetylamino-8-hydroxynaphthalene-3:6-disulfonic acid in the presence of sodium acetate. The monoazo dyestuff formed is salted out, filtered off and dissolved in 1200 parts of water at 40° C. The resulting solution is treated with 1 part of acetic acid, 30 parts of crystalline sodium acetate and 100 parts by volume of a molar aqueous copper sulfate solution, and in the course of 1 to 2 hours 180 to 230 parts by volume of a hydrogen peroxide solution of 6% strength are added dropwise, whereby the red reaction solution turns blue. The copper complex so formed is filtered off and heated for one hour at 90° C. with sodium hydroxide solution of 3% strength to eliminate the acetyl group. The reaction mixture is cooled, neutralized with hydrochloric acid and the dyestuff is filtered off and dried.

A solution of 74 parts of the resulting cupriferous aminoazo dyestuff (sodium salt) in 1000 parts of water is added to a fine suspension of 19 parts of cyanuric chloride in 400 parts of ice water and 50 parts of acetone. The mixture is condensed at 0 to 5° C. while neutralizing the liberated mineral acid by the dropwise addition of a 2 N-sodium hydroxide solution (pH 5 to 7). On completion of the reaction 50 parts by volume of aqueous ammonia of 10% strength are added and the mixture is stirred for 2 hours at 40° C. The dyestuff is then salted out, filtered off and dried; it dissolves in water with blue coloration and dyes cellulose fibers reddish blue shades.

In an identical manner there are obtained by using the diazo and coupling components shown in columns I and II of the following table and the amidating agents in column III, copper complex compounds which dye cotton the shades shown in column IV.

| I | II | III | IV |
| --- | --- | --- | --- |
| 6-chloro-2-aminonaphthalene-4:8-disulfonic acid. | 1-amino-8-hydroxynaphthalene-3:6-disulfonic acid. | Ammonia. | Reddish blue. |
| 6-nitro-2-aminonaphthalene-4:8-disulfonic acid. | 1-amino-8-hydroxynaphthalene-4-sulfonic acid. | 3-aminobenzenesulfonic acid. | Greenish blue. |
| 2-aminonaphthalene-6:8-disulfonic acid. | 1-amino-8-hydroxynaphthalene-3:6-disulfonic acid. | Ammonia. | Do. |
| 6-nitro-2-aminonaphthalene-4:8-disulfonic acid. | 1-amino-8-hydroxynaphthalene-4·6-disulfonic acid. | 4-aminobenzenesulfonic acid. | Blue. |
| 2-aminonaphthalene-5:7-disulfonic acid. | 1-amino-8-hydroxynaphthalene-3:6-disulfonic acid. | β-Hydroxyethylamine. | Reddish blue. |
| 2-aminonaphthalene-4:6-disulfonic acid. | ----do---------------- | Ammonia. | Blue. |

EXAMPLE 2

A solution of 34.8 parts of 6-nitro-2-aminonaphthalene-4:8-disulfonic acid in 100 parts of water is neutralized with sodium carbonate. The solution is mixed with 7 parts of sodium nitrite and run into a mixture of 30 parts of hydrochloric acid of 30% strength and 200 parts of ice water. The resulting diazo compound is run into a solution, containing sodium carbonate, of 52.4 parts of the secondary condensate from 1-amino-8-hydroxynaphthalene-3:6-disulfonic acid, aniline and cyanuric chloride. On completion of the coupling the dyestuff is salted out, filtered off and dissolved in 2000 parts of water. The resulting solution is treated with 1 part of acetic acid, 30 parts of crystalline sodium acetate and 100 parts by volume of a molar aqueous copper sulfate solution. About 400 parts by volume of a hydrogen peroxide solution of 6% strength are then added dropwise at 40 to 50° C. in the course of 2 hours, whereupon a strong shift from violet red to blue occurs. The reaction is complete when on subsequent addition of hydrogen peroxide the color remains unchanged. The dyestuff so formed—a copper complex in which a mobile chlorine atom is attached to the triazine—is salted out with sodium chloride, filtered off and dried. It dyes cellulose fibers, greenish blue, slightly covered tints. The dyeing is fast to light and outstandingly fast to washing.

When 6-nitro-2-aminonaphthalene-4:8-disulfonic acid is replaced by one of the diazo components in column I of the following table and the aforementioned secondary condensate by a coupling component shown in column II, there are obtained copper complexes which dye cotton the shades shown in column III.

| I | II | III |
| --- | --- | --- |
| 2-aminonaphthalene-6-sulfonic acid. | 1-(4'-phenylamino-6'-chloro-1':3':5'-triazinylamino)-8-hydroxynaphthalene-3:6:3"-trisulfonic acid. | Reddish blue. |
| 2-aminonaphthalene-8-sulfonic acid. | 1-(4'-phenylamino-6'-chloro-1':3':5'-triazinylamino)-8-hydroxynaphthalene-3:6:3"-trisulfonic acid. | Do. |
| 2-aminonaphthalene-4:6:8-trisulfonic acid. | 1-(4'-phenylamino-6'-chloro-1':3':5'-triazinylamino)-8-hydroxynaphthalene-3·6-disulfonic acid. | Blue. |

EXAMPLE 3

The diazo compound obtained from 34.8 parts of 6-nitro-2-aminonaphthalene-4:8-disulfonic acid as described in Example 2 is coupled with 36.1 parts of 1-acetylamino-8-hydroxynaphthalene-3:6-disulfonic acid in the presence of sodium acetate. The resulting dyestuff is subjected to coppering under oxidizing conditions as described in Example 1. The resulting copper complex is filtered off, stirred with 600 parts of water, rendered slightly alkaline with sodium carbonate, heated to 55° C. and treated with a solution of 50 parts of crystalline sodium sulfide in 100 parts of water. The mixture is stirred at 55 to 60° C. until the reduction and the accompanying decoppering are complete, then suction-filtered, the filtrate is acidified, and the reaction product is salted out with sodium chloride, filtered off and dried.

A solution of 70.6 parts of the resulting monoazo dyestuff in 800 parts of water is treated with 1 part of acetic acid and 30 parts of crystalline sodium acetate and then mixed with 100 parts by volume of a molar aqueous copper sulfate solution and the mixture is heated to 40 to 45° C. After a short time the coppering is complete, whereupon the copper complex is salted out with sodium chloride, filtered off and dried, to yield the dyestuff intermediate of the formula.

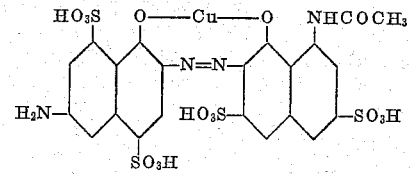

76.75 parts of the resulting coppered dyestuff, in the form of the neutral sodium salt, are dissolved in 700 parts of water and treated at 0 to 5° C. with a solution of 18.5 parts of cyanuric chloride in 60 parts of acetone. The mineral acid liberated during the condensation is neutralized (pH 6 to 7.5) by dropping in a 2 N-sodium carbonate solution. On completion of the reaction 25 parts by volume of aqueous ammonia of 20% strength are added and the mixture is stirred for 2 hours at 40° C. The dystuff so formed is salted out, filtered off and dried; it forms a dark blue powder which dissolves in water with reddish blue coloration and dyes cellulose fibers reddish blue shades of outstanding fastness to wetness and light.

When the reaction with cyanuric chloride is followed by treating the resulting solution with sodium chloride, filtering off the precipitated dyestuff and drying it at room temperature, the corresponding dichlorotriazine dyestuff is obtained which dyes cotton reddish blue shades.

When 1-acetylamino-8-hydroxynaphthalene-3:6-disulfonic acid used as coupling component is replaced by one of the following 3:6-disulfonic acids 1-propionylamino,
1-butyrylamino-,
1-β-chloropropionylamino-,
1-acrylamino-,
1-benzoylamino-,
1-(4'-chlorobenzoylamino)- or
1-(2'-chlorobenzoylamino)-8-hydroxynaphthalene there are obtained dyestuffs which dye cotton reddish blue to blue tints which have very good fastness to washing.

When in the present example the 1-acetylamino-8-hydroxynaphthalene-3:6-disulfonic acid is replaced by 1-propionylamino-4:6-disulfonic acid, 1-acetylamino-4:6-disulfonic acid or 1-benzoylamino-8-hydroxynaphthalene-4:6-disulfonic acid, or by 1-acetylamino-8-hydroxynaphthalene-4-sulfonic acid, there are obtained dyestuffs which dye cotton slightly more reddish tints.

EXAMPLE 4

76.75 parts of the dyestuff intermediate of the formula

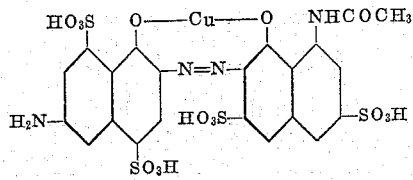

prepared as described in Example 3 are heated in 500 parts of sodium hydroxide solution of 4% strength for 2 hours at 90° C. The dyestuff solution is cooled to room temperature and rendered weakly acidic (pH 5.0 to 5.5) with 2 N-acetic acid solution. To re-copper the dyestuff intermediate which may have lost some of its copper during the hydrolysis, 30 parts of a molar aqueous copper sulfate solution are added. The mixture is stirred for one hour at 40° C., the dyestuff solution is saturated with sodium chloride and potassium chloride, and the whole is stirred until the dyestuff has precipitated which is then filtered off and dried.

36.3 parts of the resulting dyestuff, which contains two acylatable amino groups, are dissolved in 800 parts of water and mixed at 0 to 5° C. with a solution of 18.5 parts of cyanuric chloride in 60 parts by volume of acetone. The mineral acid liberated during the condensation is continually neutralized (pH 6.0 to 7.5) by adding 2 N-sodium hydroxide solution. On completion of the reaction 50 parts by volume of aqueous ammonia of 10% strength are added and the mixture is stirred for 3 hours at about 35° C. The dyestuff is then salted out, filtered off and dried. It forms a bluish black powder which dissolves in water with blue coloration and dyes cellulose fibers blue shades of excellent fastness to wetting.

EXAMPLE 5

73.7 parts of the tetrasodium salt of the aminoazo dyestuff of the formula

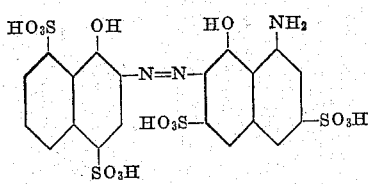

(prepared by coupling diazotized 2-amino-1-hydroxynaphthalene-4:8-disulfonic acid with 1-amino-8-hydroxynaphthalene-3:6-disulfonic acid in the presence of calcium hydroxide) are dissolved in 1000 parts of water and treated with 25 parts of crystalline sodium acetate. A solution of 26 parts of crystalline copper sulfate is then run in and the mixture is stirred for 30 minutes at 30° C.

The resulting solution of the copper complex is then run into a suspension of 19 parts of cyanuric chloride in 300 parts of ice water and 60 parts of acetone and the reaction mixture is neutralized (pH 5.5 to 6) with a dilute sodium hydroxide solution. When a free amino group can no longer be detected, the resulting dichlorotriazine dyestuff is salted out with sodium chloride and filtered off. The filter cake is intimately mixed with a concentrated solution of 5 parts of monosodium phosphate and 5 parts of disodium phosphate and dried in vacuo at 40 to 50° C. The dyestuff dissolves in water with blue coloration and dyes cotton reddish blue tints.

When the crude solution of the dichlorotriazine dyestuff prepared as described above is mixed with 40 parts of aqueous ammonia of 10% strength and the reaction mixture is stirred for 3 hours at 40° C., the aminochlorotriazine dyestuff is formed, which is salted out with sodium chloride, filtered off and dried. It dyes cellulose fibers reddish blue tints.

EXAMPLE 6

The solution of the copper complex compound prepared as described in the first paragraph of Example 5 is mixed with an aqueous solution of 34.3 parts of the sodium salt of 2:4-dichloro-6-phenylamino-1:3:5-triazine-3'-sulfonic acid and the mixture is stirred for 2 to 3 hours at 30 to 40° C. while maintaining the pH value approximately at 6 by adding sodium carbonate. On completion of the condensation the monochloro-triazine dyestuff so formed is salted out, filtered off and dried. It dyes cotton reddish blue tints.

EXAMPLE 7

A mixture of 73.7 parts of the tetrasodium salt of the metal-free aminoazo dyestuff of the formula shown in Example 5, 120 parts of a solution of sodium chromesalicylate containing 2.6% of chromium, and 800 parts of water is boiled for 6 to 10 hours.

The resulting solution of the 1:2-chromium complex is allowed to cool, neutralized with dilute hydrochloric acid and mixed with a solution of 19 parts of cyanuric chloride in 60 parts of acetone. The mixture is stirred for 2 hours at 5° C. and neutralized by the dropwise addition of about 100 parts by volume of N-sodium hydroxide solution.

5 parts of monosodium phosphate and 5 parts of disodium phosphate are added and the solution is evaporated to dryness in vacuo at 40° C. The resulting new dyestuff forms a dark powder and dyes cellulose fibers slightly covered greenish blue tints.

When the solution of the 1:2-chromium compound obtained as described above is mixed with 9.3 parts of aniline and the mixture is stirred for 4 hours at 30° C. while gradually adding about 8 parts of sodium bicarbonate, a solution of the monochlorotriazine dyestuff is obtained which is evaporated to dryness in vacuo. The dyestuff dyes cellulose fibers slightly covered greenish blue tints.

EXAMPLE 8

A solution of 73.7 parts of the tetrasodium salt of the metal-free aminoazo dyestuff of the formula shown in Example 5 in 800 parts of water is mixed with 100 parts by volume of 2 N-sodium hydroxide solution and 100 parts of a cobalt sulfate solution containing 3.25% of cobalt and the whole is heated for one hour at 80° C.

The resulting neutralized solution of the 1:2-cobalt complex compound is condensed with cyanuric chloride as described in the second paragraph of Example 7. The resulting solution of the dichlorotriazine derivative is then treated with 50 parts of aqueous ammonia of 10% strength and stirred for 2 hours at 40° C. The resulting dyestuff—an aminochlorotriazine derivative—is obtained as a powder by evaporating its solution in vacuo. It dyes cotton covered violettish blue tints.

In a similar manner the azo dyestuffs obtained from the diazo and coupling components shown in columns I and II of the following table can be converted into the complex compounds of the metals in column III which can be reacted with cyanuric chloride and the amidating agent in column IV, or with a condensate obtained from these two compounds (see Example 6). The dyestuffs so obtained dye cotton the shades shown in column V.

| I | II | III | IV | V |
|---|---|---|---|---|
| 2-amino-1-hydroxy-naphthalene-4:8-disulfonic acid. | 1-amino-8-hydroxy-naphthalene-3:6-disulfonic acid. | Cu | 4-aminobenzenesulfonic acid. | Reddish blue. |
| Do | do | Cu | Aniline | Do. |
| Do | do | Cu | Anthranilic acid | Do. |
| Do | do | Cu | β-hydroxy-ethylamine. | Do. |
| Do | do | Cu | γ-Hydroxy-propylamine. | Do. |
| Do | do | Cu | Ethylamine | Do. |
| Do | do | Cu | γ-Methoxy-propylamine. | Do. |
| Do | do | Cu | Aniline-2:5-disulfonic acid. | Do. |
| Do | do | Cu | 1-aminonaphthalene-6-sulfonic acid. | Do. |
| Do | do | Cu | Isopropylamine | Do. |
| Do | do | Cu | 4- or 5-aminosalicylic acid. | Do. |
| Do | do | Cu | N-methylaniline | Do. |
| Do | do | Cu | Para-toluidine | Do. |
| Do | do | Ni | Ammonia | Bluish violet. |
| Do | do | Ni | Morpholine | Do. |
| Do | 1-amino-8-hydroxy-naphthalene-4-sulfonic acid. | Cu | Ammonia | Covered violet blue. |
| Do | do | Cu | Ethanolamine | Do. |
| Do | do | Cr | Ammonia | Covered greenish blue. |
| Do | 1-amino-8-hydroxy-naphthalene-6-sulfonic acid. | Cu | do | Reddish blue. |
| Do | do | Cu | 3-aminobenzoic-acid | Do. |
| Do | do | Cu | Morpholine | Do. |
| 2-amino-1-hydroxy-naphthalene-4-sulfonic acid. | 1-amino-8-hydroxy-naphthalene-3:6-disulfonic acid. | Cu | Ammonia | Reddish blue. |
| 2-amino-1-hydroxy-naphthalene-5-sulfonic acid. | do | Cu | do | Do. |
| 2-amino-1-hydroxy-naphthalene-4-sulfonic acid. | do | Cr | do | Covered greenish blue. |
| Do | do | Co | do | Covered reddish blue. |
| 2-amino-1-hydroxy-naphthalene-4:6:8-trisulfonic acid. | do | Cu | do | Blue. |
| Do | do | Co | Aniline | Greyish blue. |
| 2-amino-1-hydroxy-naphthalene-4:8-disulfonic acid. | 1-ethylamino-8-hydroxy-naphthalene-3:6-disulfonic acid. | Cu | do | Violettish blue. |
| Do | 1-amino-8-hydroxy-naphthalene-3:6-disulfonic acid. | Cu | Acetylphenylene diamine. | Reddish blue. |

EXAMPLE 9

The solution of the copper complex prepared as described in the first paragraph of Example 5 is mixed with a solution of 18 parts of 6-methoxy-2:4-dichlorotriazine in 200 parts of acetone and the mixture is stirred at 30 to 35° C. while maintaining it weakly acid to neutral by gradually adding a dilute sodium hydroxide solution. The monochlorotriazine dyestuff so formed dyes cotton reddish blue tints.

Dyestuffs having similar properties are obtained when 6-methoxy-2:4-dichlorotriazine is replaced by an equivalent amount of 6-ethoxy-2:4-dichlorotriazine, or 6-propoxy-2:4-dichlorotriazine or 6-phenoxy-2:4-dichlorotriazine. When the latter is replaced by 6-phenthio-2:4-dichlorotriazine, a similar result is obtained.

EXAMPLE 10

An aqueous solution of the dichlorotriazine dyestuff prepared as described in Example 5 is mixed with a solution of 17.4 parts of para-phenolsulfonic acid and 8 parts of sodium hydroxide in 100 parts of water and the mixture is stirred for one hour at 20° C. The monochlorotriazine dyestuff so formed is filtered off and dried at not too high a temperature. It dyes cotton reddish blue tints.

Dyestuffs having similar properties are obtained by using instead of para-phenolsulfonic acid an equivalent amount of 2-mercaptobenzthiazole or mercaptoacetic acid.

EXAMPLE 11

A fine aqueous suspension of 19 parts of cyanuric chloride is mixed at 0 to 5° C. with a solution of 39.2 parts of the sodium salt of para-phenolsulfonic acid and 8 parts of sodium hydroxide in 200 parts of water and the reaction mixture is stirred until it has become neutral, while allowing the temperature to rise to 20° C. The whole is then treated with an aqueous solution of 76 parts of the copper complex of the formula shown in Example 3 and the mixture is stirred for about 2 hours at 60 to 70° C. at a pH value of 6 to 7, and the solution is then evaporated to dryness. The new dyestuff dyes cellulose fibers reddish blue shades which are fast to washing.

EXAMPLE 12

A solution of 30 parts of β-chloropropionyl chloride in 50 parts of acetone is slowly run into a solution of 72 parts of the copper complex (containing two amino groups) prepared as described in the first paragraph of Example 4, while continually neutralizing the liberated mineral acid by adding dilute sodium hydroxide solution.

The dyestuff so formed is then salted out, filtered off and dried. It dyes cotton reddish blue tints.

When β-chloropropionyl chloride is replaced by an equivalent amount of α:β-dibromopropionyl chloride, acrylic acid chloride or anhydride, chloromaleic acid anhydride, or α-chloroacrylic chloride, dyestuffs are obtained which have similar properties.

EXAMPLE 13

The solution of the copper complex prepared as described in the first paragraph of Example 5 is treated dropwise with a solution of 15 parts of acrylic acid chloride in 50 parts of acetone and at the same time with an aqueous sodium acetate solution in a manner such that the reaction mixture always remains neutral to Congo red. When an amino group can no longer be detected, the resulting dyestuff is salted out and filtered off. It dyes cellulose fibers reddish blue tints which are fast to light and washing.

Dyestuffs having similar properties are obtained when acrylic acid chloride is replaced by an equivalent amount of α-chloracrylic acid chloride or β-bromopropionyl chloride.

EXAMPLE 14

A solution of 19 parts of cyanuric chloride in 60 parts of acetone is vigorously stirred into an aqueous solution cooled with ice of 73.7 parts of the tetrasodium salt of the aminoazo dyestuff of the formula shown in Example 5, and the mixture is then stirred for 1 to 2 hours at 5° C. while maintaining its reaction weakly acid to litmus (pH 5 to 5.5) by adding dropwise a dilute sodium hydroxide solution. 50 parts of ammonia of 10% strength are then added and the mixture is stirred for 2 hours at 30 to 35° C. Coppering is performed by adding an aqueous ammoniacal solution of copper sulfate (prepared from 26 parts of copper sulfate and 50 parts of concentrated ammonia) and the mixture is heated for about 30 minutes at 30° C., whereupon the dyestuff is salted out and filtered off. Its properties are substantially identical with those of the dyestuff prepared as described in the last paragraph of Example 5.

Instead of performing the amidation and the coppering in two stages as described above, they may be performed in a single stage by adding a strongly ammoniacal copper sulfate solution to the resulting dichlorotriazine compound and stirring the mixture further for 2 to 3 hours at the indicated temperature.

Dyeing method A

A cotton fabric is impregnated with a solution of 2 parts of the dyestuff prepared as described in Example 1 in 100 parts of water, squeezed until its weight shows an increase of 75% and then dried.

The fabric is then impregnated with a solution at 20° C. containing per liter 10 grams of sodium hydroxide and 300 grams of sodium chloride, squeezed to a weight increase of 75%, the dyeing is steamed for 60 seconds at 100 to 101° C., rinsed, soaped for 15 minutes in a boiling 0.3% solution of a non-ionic detergent, rinsed and dried.

A reddish blue dyeing is obtained which is fast to washing and light.

Dyeing method B

A cotton fabric is impregnated with a solution of 3 parts of the dyestuff prepared as described in the first paragraph of Example 2, 2 parts of sodium carbonate and 25 parts of urea in 75 parts of water, then squeezed to a weight increase of 75%, dried at 80° C., exposed to dry heat if 140° C. for 6 minutes, rinsed and soaped at the boil. A greenish blue dyeing is obtained.

What is claimed is:

1. A complex copper compound containing one atom of copper in complex union with substantially one molecule of a monoazo-dyestuff of the formula

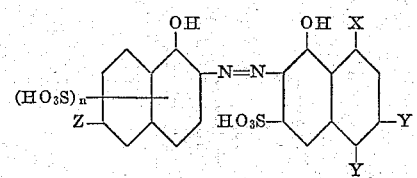

in which $n$ is a positive whole number of at most 2, one Y is sulfonic acid and the other Y hydrogen, Z is a member selected from the group consisting of hydrogen, chlorine, nitro, sulfonic acid, acetylamino and halogenotriazinyl-amino, halogenotriazinyl- meaning a radical of the formula

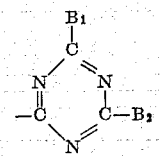

wherein $B_1$ is a member selected from the group consisting of chlorine and bromine and $B_2$ is a member selected from the group consisting of chlorine, bromine, an amino group, an etherified hydroxy group and an etherified mercapto group, X is a member selected from the group consisting of an alkyl carboxylic acid amide radical containing at most 4 carbon atoms, an aromatic carboxylic acid amide radical of the benzenes series, the chloromaleic acid amide radical, the acrylic acid amide radical, the chloroacrylic acid amide radical, the chloroacetic acid amide radical, the β-chloropropionic acid amide radical, the β-bromopropionic acid amide radical, the α:β-dichloropropionic acid amide radical and a halogenotriazinyl-amino radical, halogenotriazinyl- meaning a radical as defined above, and which dyestuff contains at least two sulfonic acid groups in the radical of the diazo component and at least one radical, selected from the group consisting of the chloromaleic acid amide radical, the acrylic acid amide radical, the chloroacrylic acid amide radical, the chloroacetic acid amide radical, the β-chloropropionic acid amide radical, the β-bromopropionic acid amide radical, the α:β-dichloropropionic acid amide radical, and a halogenotriazinylamino radical, halogenotriazinyl- meaning a radical as defined above.

2. A complex copper compound containing one atom of copper in complex union with substantially one molecule of a monoazo-dyestuff of the formula

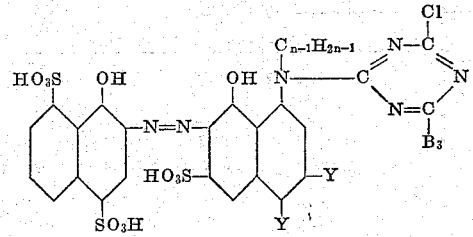

in which $n$ is a positive whole number of at most 3, one Y is hydrogen and the other Y sulfonic acid and $B_3$ is an amino group.

3. A complex copper compound containing one atom of copper in complex union with substantially one molecule of a monoazo-dyestuff of the formula

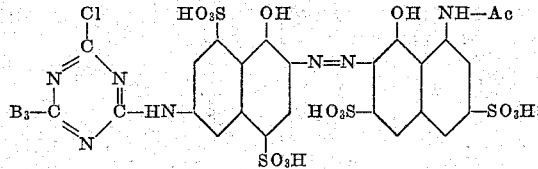

in which Ac is the radical of an aliphatic carboxylic acid containing at most 4 carbon atoms and $B_3$ is an amino group.

4. A complex copper compound containing one atom of copper in complex union with substantially one molecule of a monoazo-dyestuff of the formula

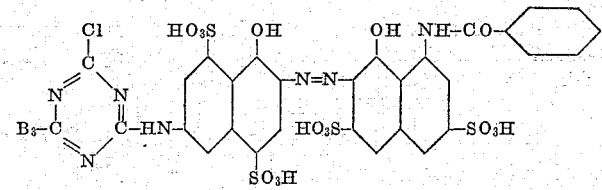

in which $B_3$ is an amino group.

5. A complex copper compound containing one atom of copper in complex union with substantially one molecule of a monoazo-dyestuff of the formula

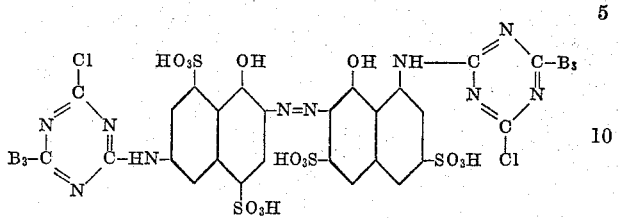

in which $B_3$ is an amino group.

6. The complex copper compound containing one atom of copper bound in complex union with substantially one molecule of a monoazo-dyestuff of the formula

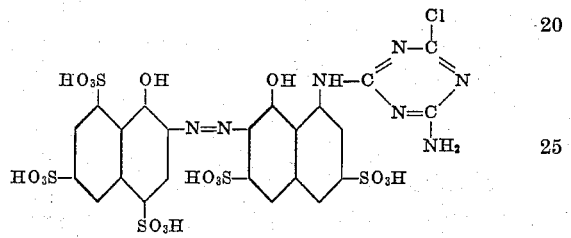

7. The complex copper compound containing one atom of copper bound in complex union with substantially one molecule of a monoazo-dyestuff of the formula

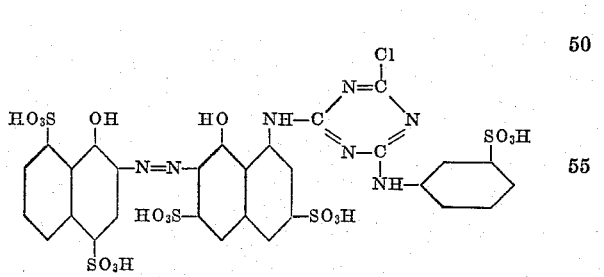

8. The complex copper compound containing one atom of copper bound in complex union with substantially one molecule of a monoazo-dyestuff of the formula

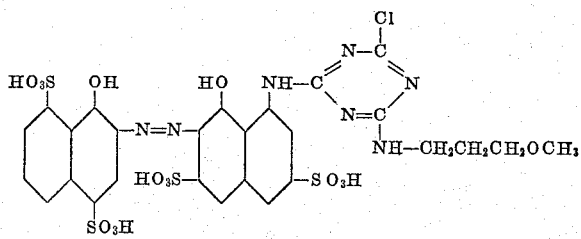

9. The complex copper compound containing one atom of copper bound in complex union with substantially one molecule of a monoazo-dyestuff of the formula 10. The complex copper compound containing one atom of copper bound in complex union with substantially one molecule of a monoazo-dyestuff of the formula

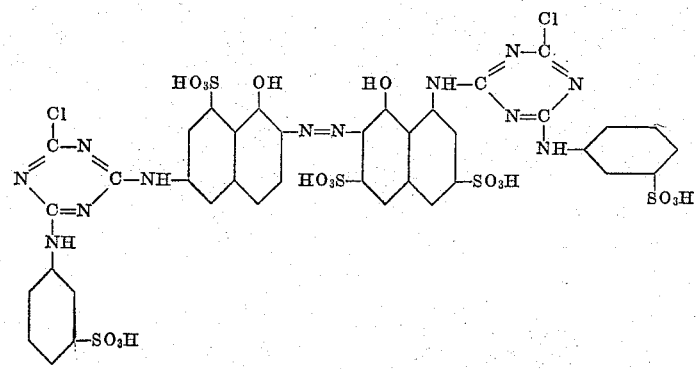

11. The complex copper compound containing one atom of copper bound in complex union with substantially one molecule of a monoazo-dyestuff of the formula

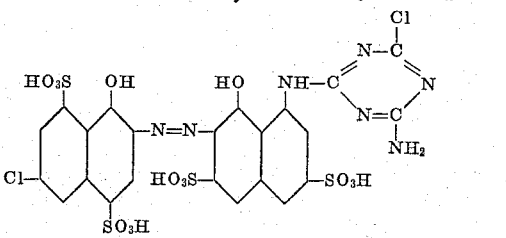

References Cited in the file of this patent
UNITED STATES PATENTS

| | | |
|---|---|---|
| 2,963,472 | Seitz et al. | Dec. 6, 1960 |
| 2,987,513 | Schmidt | June 6, 1961 |
| 3,114,746 | Benz et al. | Dec. 17, 1963 |